(12) United States Patent
Shoham

(10) Patent No.: US 10,213,952 B2
(45) Date of Patent: Feb. 26, 2019

(54) OPEN-CLIP BLOW MOLDING METHOD AND A BLOW MOLDED ARTICLE WHICH INTEGRALLY PROVIDE A CLIP FOR SECUREMENT TO ANOTHER ITEM

(71) Applicant: MEDONYX INC., Toronto (CA)

(72) Inventor: Gilad Shoham, Toronto (CA)

(73) Assignee: MEDONYX INC., Toronto (CA)

( * ) Notice: Subject to any disclaimer, the term of this patent is extended or adjusted under 35 U.S.C. 154(b) by 725 days.

(21) Appl. No.: 14/626,423

(22) Filed: Feb. 19, 2015

(65) Prior Publication Data

US 2015/0231815 A1  Aug. 20, 2015

Related U.S. Application Data

(60) Provisional application No. 61/941,955, filed on Feb. 19, 2014.

(51) Int. Cl.
| | | |
|---|---|---|
| *B29C 49/48* | (2006.01) | |
| *B29C 49/06* | (2006.01) | |
| *B65D 1/02* | (2006.01) | |
| *B65D 23/00* | (2006.01) | |
| *B29C 49/04* | (2006.01) | |

(Continued)

(52) U.S. Cl.
CPC ............ *B29C 49/482* (2013.01); *B29C 49/06* (2013.01); *B65D 1/0261* (2013.01); *B65D 23/003* (2013.01); *B29C 49/04* (2013.01); *B29K 2023/065* (2013.01); *B29K 2023/0633* (2013.01); *B29K 2105/0038* (2013.01); *B29K 2105/16* (2013.01); *B29K 2509/00* (2013.01); *B29L 2031/712* (2013.01);

(Continued)

(58) Field of Classification Search
None
See application file for complete search history.

(56) References Cited

U.S. PATENT DOCUMENTS

| 4,629,598 A | 12/1986 | Thompson |
|---|---|---|
| 5,433,339 A | 7/1995 | Sarver |

(Continued)

FOREIGN PATENT DOCUMENTS

| CA | 1302055 | 6/1992 |
|---|---|---|
| CA | 2617478 | 7/2008 |

(Continued)

*Primary Examiner* — Monica A Huson
(74) *Attorney, Agent, or Firm* — Holbeche Law; Kevin Edward Holbeche

(57) ABSTRACT

In a method, an article of unitary construction is blow molded and integrally provided with a clip for securement to another item. The clip has an arm initially blow molded into an open elevated configuration. The arm is pivotable into closed and open configurations. When closed, the arm is in selectively releasable and secure engagement with a catch on the article. The arm is biased towards the catch. When open, the arm is depressed relative to and biased towards the closed configuration. The open configuration is traversed to secure the article to the item. In the open elevated configuration, the arm is elevated relative to the closed configuration. The arm is preferably a carabiner-type arm. The article is preferably formed of a composition of matter including polyethylene and plastic additives to provide the arm with sufficient pre-built tension to stay in the aforesaid selectively releasable and secure engagement.

10 Claims, 10 Drawing Sheets

(51) Int. Cl.
    *B29K 23/00*     (2006.01)
    *B29K 105/00*     (2006.01)
    *B29K 105/16*     (2006.01)
    *B29K 509/00*     (2006.01)
    *B29L 31/00*     (2006.01)
    *F16B 45/02*     (2006.01)

(52) U.S. Cl.
    CPC ......... *F16B 45/02* (2013.01); *Y10T 428/1372* (2015.01); *Y10T 428/1397* (2015.01)

(56) References Cited

U.S. PATENT DOCUMENTS

| | | | |
|---|---|---|---|
| 8,136,693 B2* | 3/2012 | Thatcher | A45F 3/16 215/399 |
| 8,316,509 B1 | 11/2012 | Thomson et al. | |
| 2008/0098952 A1 | 5/2008 | Healy | |
| 2009/0095703 A1 | 4/2009 | Keeler | |
| 2010/0262114 A1 | 10/2010 | Brandenburger et al. | |
| 2012/0132556 A1 | 5/2012 | Webster | |
| 2015/0083686 A1* | 3/2015 | Jordan | B65D 51/242 215/228 |

FOREIGN PATENT DOCUMENTS

| | | |
|---|---|---|
| CA | 2770031 | 3/2012 |
| CA | 2872995 | 11/2013 |
| DE | 10 2007 056 486 A1 | 5/2009 |
| WO | 2015123760 A1 | 8/2015 |

\* cited by examiner

OPEN-CLIP BLOW MOLDING METHOD AND A BLOW MOLDED ARTICLE WHICH INTEGRALLY PROVIDE A CLIP FOR SECUREMENT TO ANOTHER ITEM

FIELD OF THE INVENTION

The present disclosure relates generally to a blow molding method and a blow molded article and, more particularly, to an open-clip blow molding method, a blow molded article integrally provided with a clip for securement to another item, and such an article and clip formed of a composition of matter.

BACKGROUND OF THE INVENTION

It frequently may be useful to secure a container to another item. For example, it may be useful to readily secure a hand sanitizer bottle to a backpack.

As illustrated in FIG. 1, some prior art bottles have been provided with an opening or ring, potentially for attachment of a clip, such as a traditional carabiner and/or spring clip. However, one of the shortcomings of the prior art in this regard may have been the need for additional components, such as a separate clip, and/or any related time, trouble and/or effort required for assembly.

There may have existed blow molded bottles having clip portions in the prior art. Such prior art bottles may have been blow molded with their clip portions in a closed configuration—i.e., molded with one or more parts in a net-shape.

In use, an arm portion of a clip on such a prior art container may have been semi or fully depressed from the closed configuration to permit the container's clip to pass through a detente or catch provided on another item. Ideally, the arm portion of such container's clip would then be returned to the closed configuration (from the depressed or semi-depressed configuration) to secure the container to the other item.

Alternately, such prior art bottles may have been molded with their clip portions in a semi-depressed (i.e., slightly closed) configuration, potentially relying upon a desired shrinkage of the bottles' plastic material during cooling to cause their clip portions to warp and/or deform into a closed clip configuration.

Other prior art methods for providing a clip portion in a blow molded bottle may have involved molding the clip portion in a semi-depressed geometry and then—as a post-process—manually pushing and/or positioning the clip into a closed configuration, and applying heat to a hinge-point of the bottle's clip portion, such as to encourage material of the hinge-point to thermally set into the closed configuration.

Prior art polyethylene materials may have provided mechanical "springback" properties.

Prior art containers (and/or clip portions thereof), materials and/or related blow molding and/or materials technologies may have inadequately provided for secure releasable fastening of such containers to other items, for clips biased towards a securely closed configuration, and/or for any "springback" properties which may have been sought. It may be readily appreciated by or suggested to those skilled in the art—in view of the disclosures herein—that there have been one or more disadvantages or shortcomings associated with the prior art, or that the prior art has failed to meet one or more needs or to provide certain previously unforeseen advantages such as now afforded by the invention.

It is an object of the present invention to obviate or mitigate one or more disadvantages and/or shortcomings associated with the prior art, to meet or provide for one or more needs and/or advantages, and/or to achieve one or more objects of the invention—one or more of which may preferably be readily appreciable by and/or suggested to those skilled in the art in view of the teachings and/or disclosures hereof.

SUMMARY OF THE INVENTION

According to the invention, there is disclosed a method to produce an article having a clip for securing the article to another item. The method includes a step of blow molding the article to have a unitary construction and to integrally provide the clip as a part of the article. This blow molding step is such that the clip has a carabiner-type arm which is initially blow molded into an open elevated configuration. The carabiner-type arm is resiliently pivotable from the open elevated configuration into (i) a closed configuration and (ii) a depressed open configuration. In the closed configuration, the carabiner-type arm is biased into selectively releasable and secure engagement with a catch portion provided on the article. In the depressed open configuration, the carabiner-type arm is depressed relative to and biased towards the closed configuration. The depressed open configuration is traversed to secure the article to the aforesaid item. The blow molding step is also such that, in the open elevated configuration, the carabiner-type arm is elevated relative to the closed configuration.

According to an aspect of one preferred embodiment of the invention, the article may preferably, but need not necessarily, be blow molded such that the clip preferably has a hinge where the clip bends. The carabiner-type arm may preferably, but need not necessarily, be resiliently pivotable from the open elevated configuration, preferably about the hinge, into the closed configuration and/or the depressed open configuration.

According to an aspect of one preferred embodiment of the invention, preferably in the closed configuration, the carabiner-type arm may preferably, but need not necessarily, be biased with sufficient pre-built tension to stay in selectively releasable and secure engagement with the catch portion.

According to an aspect of one preferred embodiment of the invention, preferably after the carabiner-type arm is initially blow molded into the open elevated configuration, the carabiner-type arm may preferably, but need not necessarily, be selectively pivotable—preferably by hand—from the open elevated configuration into the closed configuration, and/or from the closed configuration into the depressed open configuration.

According to an aspect of one preferred embodiment of the invention, preferably after the carabiner-type arm is initially blow molded into the open elevated configuration, the carabiner-type arm may preferably, but need not necessarily, be initially moved from the open elevated configuration into the closed configuration, preferably by one or more automated processes.

According to an aspect of one preferred embodiment of the invention, preferably after the carabiner-type arm is blow molded into the open elevated configuration, the clip may preferably, but need not necessarily, be allowed to cool and/or set in the elevated open position, preferably before the carabiner-type arm may be moved to the closed configuration.

According to an aspect of one preferred embodiment of the invention, the article may preferably, but need not necessarily, be extrusion blow molded, and/or the carabiner-type arm may preferably, but need not necessarily, be initially extrusion blow molded into the open elevated configuration.

According to an aspect of one preferred embodiment of the invention, the article may preferably, but need not necessarily, be injection blow molded, and/or the carabiner-type arm may preferably, but need not necessarily, be initially injection blow molded into the open elevated configuration.

According to an aspect of one preferred embodiment of the invention, the carabiner-type arm may preferably, but need not necessarily, be biased with sufficient pre-built tension to return to the closed configuration, preferably after the carabiner-type arm may be mechanically moved to the depressed open configuration.

According to an aspect of one preferred embodiment of the invention, the article may preferably, but need not necessarily, be blow molded as a hollow container.

According to the invention, there is also disclosed a blow molded article of unitary construction comprising an integral clip for securing the blow molded article to another item. The clip has a catch portion and a carabiner-type arm initially blow molded into an open elevated configuration. The carabiner-type arm is resiliently pivotable from the open elevated configuration into (i) a closed configuration and (ii) a depressed open configuration. In the closed configuration, the carabiner-type arm is biased into selectively releasable and secure engagement with the catch portion. In the depressed open configuration, the carabiner-type arm is depressed relative to and biased towards the closed configuration. The depressed open configuration is traversed to secure the article to said item. In the open elevated configuration, the carabiner-type arm is elevated relative to the closed configuration.

According to an aspect of one preferred embodiment of the invention, the carabiner-type arm may preferably, but need not necessarily, be in the closed configuration.

According to the invention, there is also disclosed a blow molded article of unitary construction which includes an integral clip for securing the blow molded article to another item. The clip has a catch portion and an arm resiliently pivotable between an open configuration and a closed configuration. In the closed configuration, the arm is in selectively releasable and secure engagement with the catch portion. The arm is biased towards the closed configuration with sufficient pre-built tension for the arm to stay in the aforesaid selectively releasable and secure engagement with the catch portion. The blow molded article of unitary construction is formed of a composition of matter which includes one or more polyethylene materials and one or more plastic additives so as to thus provide the arm with the aforesaid sufficient pre-built tension.

According to an aspect of one preferred embodiment of the invention, the composition of matter may preferably, but need not necessarily, be adapted for forming the blow molded article by extrusion blow molding and/or by injection blow molding.

According to an aspect of one preferred embodiment of the invention, the composition of matter may preferably, but need not necessarily, also include at least one of a polypropylene material, a polycarbonate material, and a polyvinyl chloride ("PVC") material.

According to an aspect of one preferred embodiment of the invention, the polyethylene materials of the composition of matter may preferably, but need not necessarily, include a combination of one or more high-density polyethylene ("HDPE") materials and/or one or more low-density polyethylene ("LDPE") materials.

According to an aspect of one preferred embodiment of the invention, the combination may preferably, but need not necessarily, include a controlled blend of (a) the HDPE materials preferably so as to thus provide the arm and/or the clip with rigidity in mechanical structure, and/or (b) the LDPE materials preferably so as to thus provide the arm and/or the clip with flexibility, together preferably so as to thus provide the arm with the aforesaid sufficient pre-built tension.

According to an aspect of one preferred embodiment of the invention, the additives may preferably, but need not necessarily, include at least one of a flexibilizer material, a plasticizer materials, and an impact modifier material.

According to an aspect of one preferred embodiment of the invention, the additives may preferably, but need not necessarily, include at least one structural modifier material.

According to an aspect of one preferred embodiment of the invention, the structural modifier material may preferably, but need not necessarily, include at least one fiber material.

According to an aspect of one preferred embodiment of the invention, the fiber material may preferably, but need not necessarily, include at least one of a glass fiber material and a carbon fiber material.

According to an aspect of one preferred embodiment of the invention, the structural modifier material may preferably, but need not necessarily, include at least one mineral filler material.

According to an aspect of one preferred embodiment of the invention, the mineral filler material may preferably, but need not necessarily, include a talc material.

According to an aspect of one preferred embodiment of the invention, the arm may preferably, but need not necessarily, be a carabiner-type arm. The open configuration may preferably, but need not necessarily, be a depressed open configuration wherein the carabiner-type arm is preferably depressed relative to the closed configuration. The depressed open configuration may preferably, but need not necessarily, be traversed to secure the article to the aforesaid item. The carabiner-type arm may preferably, but need not necessarily, be initially blow molded into and/or resiliently pivotable from an open elevated configuration whereat the carabiner-type arm may preferably, but need not necessarily, be elevated relative to the closed configuration.

According to an aspect of one preferred embodiment of the invention, the blow molded article of unitary construction may preferably, but need not necessarily, be blow molded as a hollow container.

Other advantages, features and/or characteristics of the present invention, as well as methods of operation and/or functions of the related elements of the blow molded article and method, and/or the combination of steps, parts and/or economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the blow molded article and method according to the present invention, as to their structure, organization, use, and/or method of operation, together with further objectives and/or advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF PREFERRED EMBODIMENTS

Figure 1:
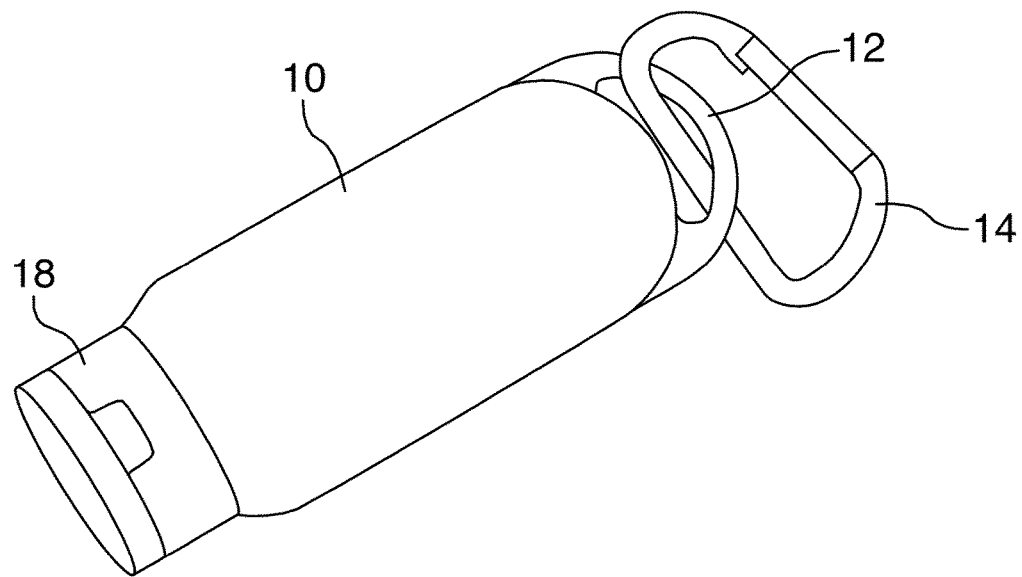
FIG. 1 depicts a prior art bottle having a ring with a prior art carabiner attached thereto.

FIG. 1 illustrates a prior art bottle 10 having a ring 12 which defines a punch-out opening and a prior art carabiner 14 attached thereto. The bottle 10 is shown with a flip-top cap 18.

Herein is described, according to the invention and with reference to FIGS. 2A through 8B, a novel and inventive method of producing improved clips 30 in blow molded plastic components 20, preferably by an "open clip" blow molding method to produce an improved integral clip 30 in a blow molded apparatus 20, and/or preferably by using one or more additives to enhance mechanical flex and/or spring-back properties in an improved blow-molded clip 30.

Such blow molded plastic components 20—e.g., blow molded apparatus, blow molded articles, and other potential materials that can be blow-molded—preferably include bottles, canisters, and other hollow items which make use of blow molding.

Also described herein is a method and composition of matter to produce an integral clip 30 in an apparatus 20 and, more specifically, to an "open clip" blow molding method and composition of matter to produce an improved integral clip 30 in a blow molded apparatus 20.

According to the invention, clip 30 geometry is preferably incorporated right into the geometry of a blow molded article 20, and a method of preferably producing such a blow molded article 20 is disclosed herein.

Figure 2A:
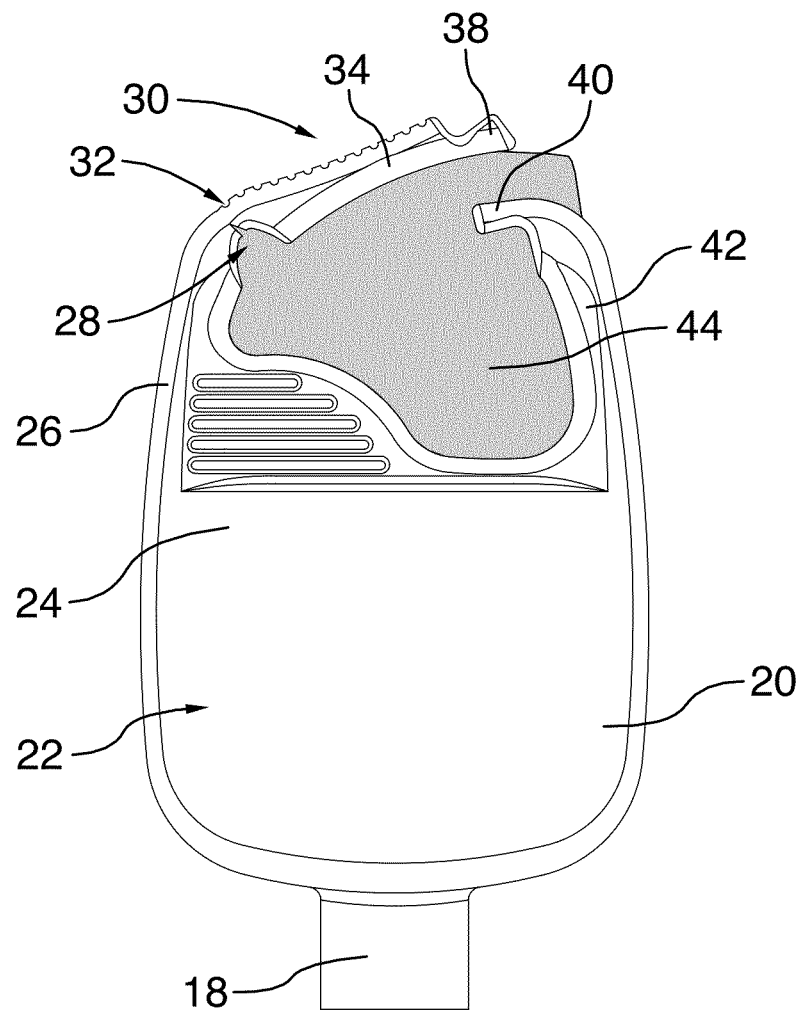
FIG. 2A is a front elevational view of a bottle formed according to the invention, shown with a knock-out member and with an arm of the bottle in an open elevated configuration.
Figure 3:
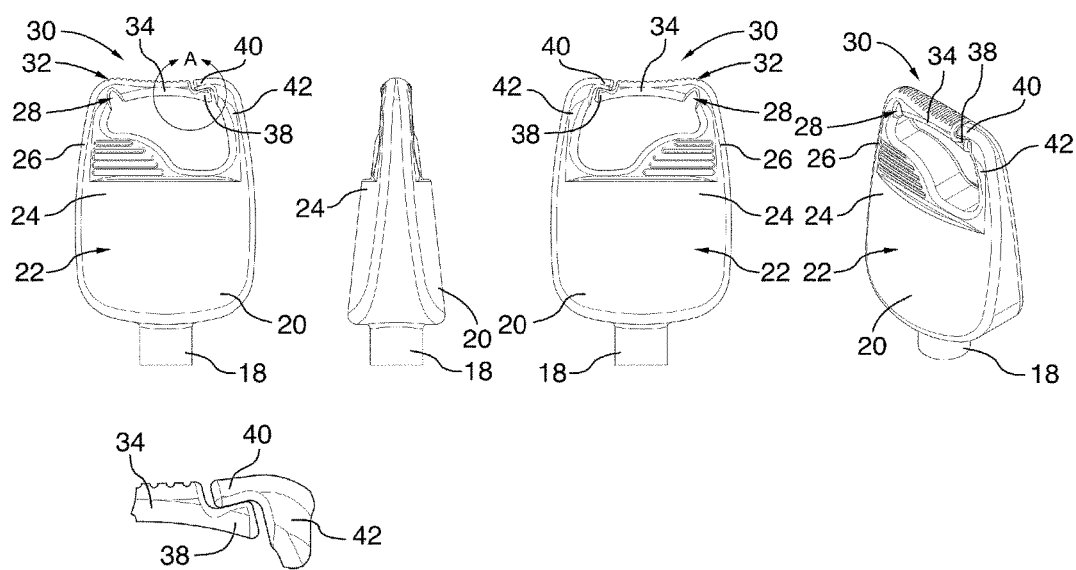
FIG. 3 depicts front, left and rear elevational views, an enlarged view of encircled portion A, and a top front left perspective view of the bottle of FIG. 2B, all shown with the arm in the closed configuration.
Figure 4:
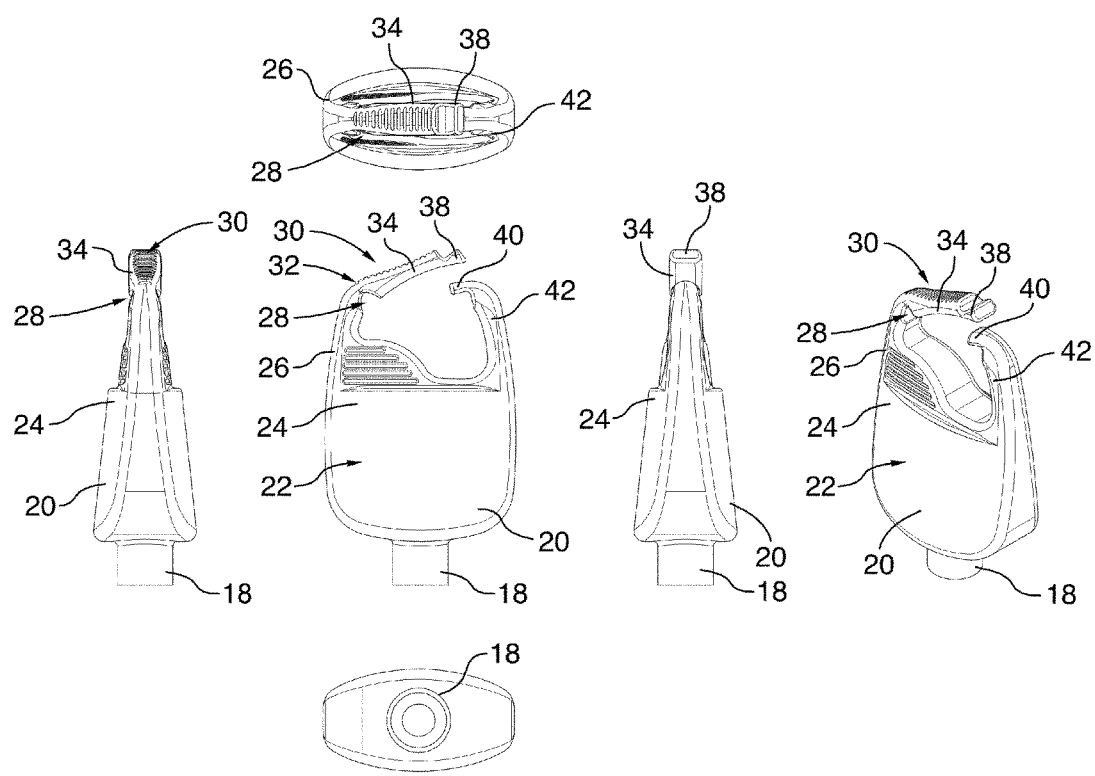
FIG. 4 depicts right, front, left and rear elevational views, and top and bottom views of the bottle of FIG. 2A, all shown with the arm in the open elevated configuration.

According to the invention, a clip portion 30 (in many respects similar to, for instance, a carabiner) is preferably molded right into a geometry of a blow-molded container 20 itself. FIG. 2A shows a bottle 20 which, according to some preferred embodiments of the invention, may be formed with a knock-out member 44 for later removal. According to the invention, and possibly with the aid of the knock-out member 44, the clip portion 30 is preferably molded in an open elevated configuration (as shown in FIGS. 2A and 4). In this respect, the open elevated configuration is preferably to be distinguished from the fully and/or semi-depressed open configuration (as shown in FIG. 2C)—the latter of which may preferably be traversed to secure the container 20 to another item. That is, in the open elevated configuration (and preferably unlike any depressed open configuration), the arm portion 34 of the clip 30 is preferably elevated (rather than depressed) relative to the closed configuration (as shown in FIGS. 2B and 3).

FIG. 2A shows the bottle 20 with the knock-out member 44 and with the arm 34 of the bottle 20 in the open elevated configuration. The bottle 20 is molded in the open configuration and, as also described elsewhere herein, integrally molded with hinge point 32 geometry and "catch" 38, 40 geometry.

Figure 2B:
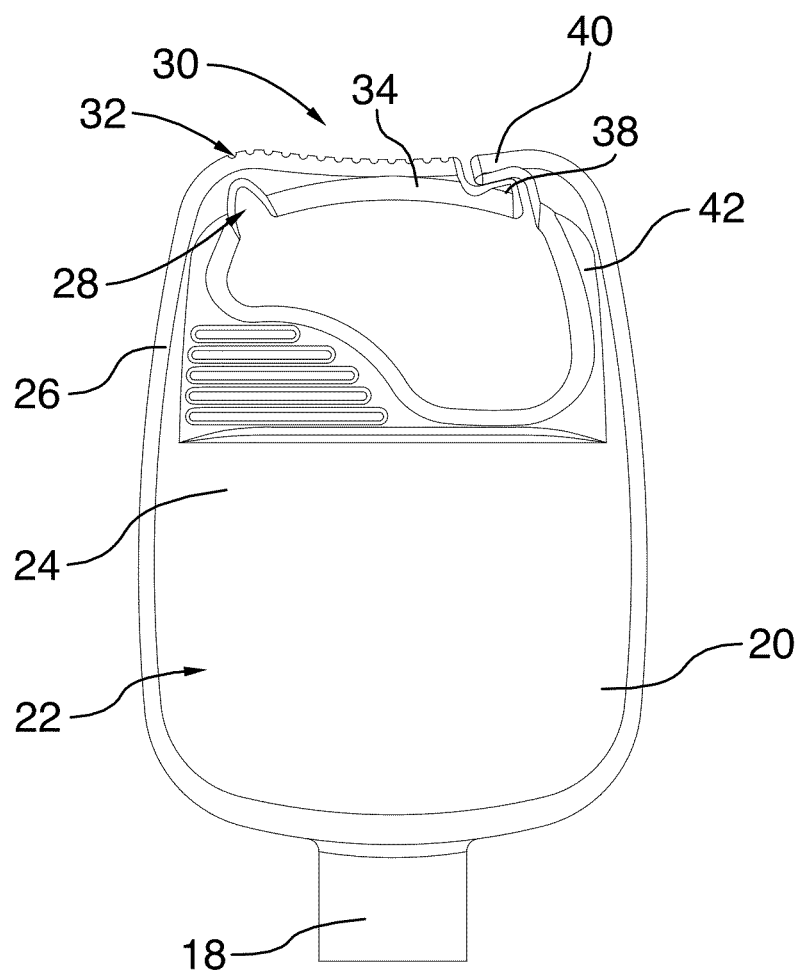
FIG. 2B is a front elevational view of the bottle of FIG. 2A, shown without the knock-out member and with the arm in a closed configuration.
Figure 2C:
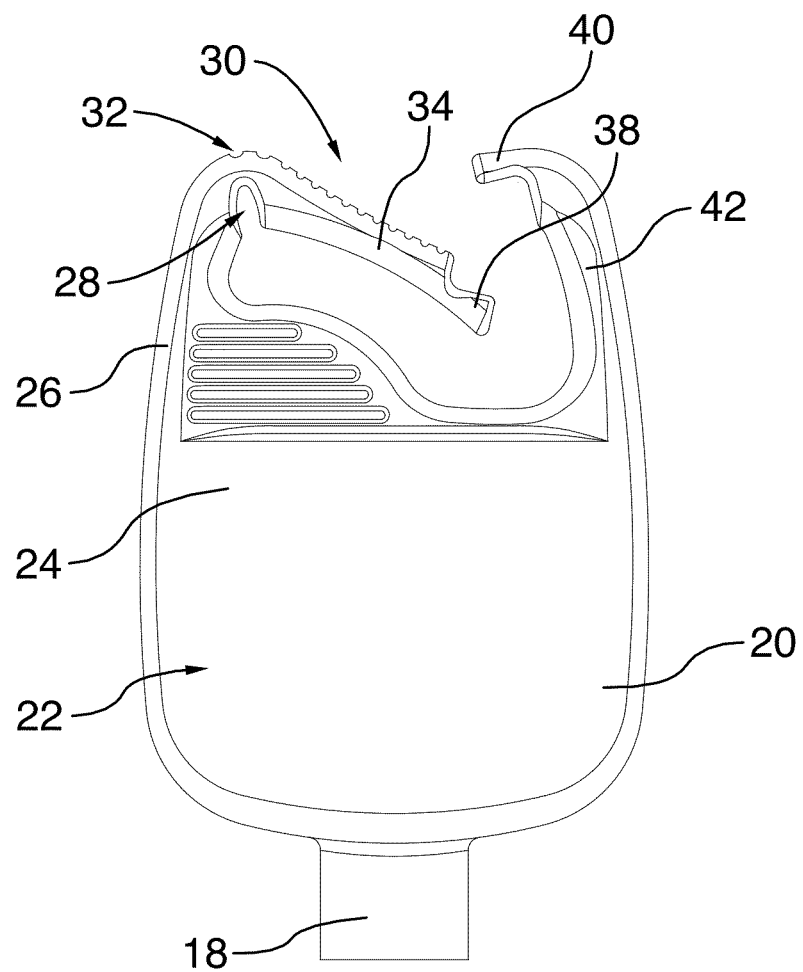
FIG. 2C is a front elevational view of the bottle of FIG. 2A, shown without the knock-out member and with the arm in a depressed open configuration.

FIG. 2B does not show the knock-out member 44 of FIG. 2A and shows the arm 34 in the closed configuration, bent around hinge-point 32. The arm 34 as shown provides constant pre-tension force, preferably due to molded-in tension on the plastic, applied by the arm 34 at the catch 38, 40 area. The geometry of the catch 38, 40 is preferably angled such that inherent spring tension applied by the arm 34 draws together the arm 34 and the catch arm 42.

Molding the clip portion 30 of a blow molded container 20 in the open configuration preferably provides the following benefits: it preferably eases manufacturing methods of removing excess flash material and/or, perhaps significantly, it preferably creates a pre-load on the integrally molded spring clip portion 30. That is, in this last respect, the clip 30 is preferably biased towards the closed configuration when its arm portion 34 is moved into a depressed configuration to secure the container 20 to another item (not shown).

Various depictions of a container 20 having a clip portion 30 according the invention are provided in FIGS. 2A to 4. The container 20 is shown with a flip-top cap 18. The container 20 is preferably hollow and defines an interior chamber 22. The clip portion 30 preferably includes a body 24, a hinge arm 26 extending from one side of the body 24, and a hinge 32 on the hinge arm 26. The hinge 32 is preferably provided with a notch 28, and the arm portion 34 extends from the hinge 32. A catch arm 42 preferably extends from another side of the body 24. Preferably, in the closed configuration, an arm catch 38 provided on the arm portion 34 securely engages a catch portion 40 provided on the catch arm 42 in selectively releasable relation.

By molding the clip 30 OPEN and elevated, and by incorporating into the design a "living hinge point" 32, it is preferably possible to dictate (by means of design) exactly where the clip 30 will bend, and to ensure that it will have enough pre-built tension to stay in the closed position and have sufficient spring-back to return to its original shape and position.

Figure 5:
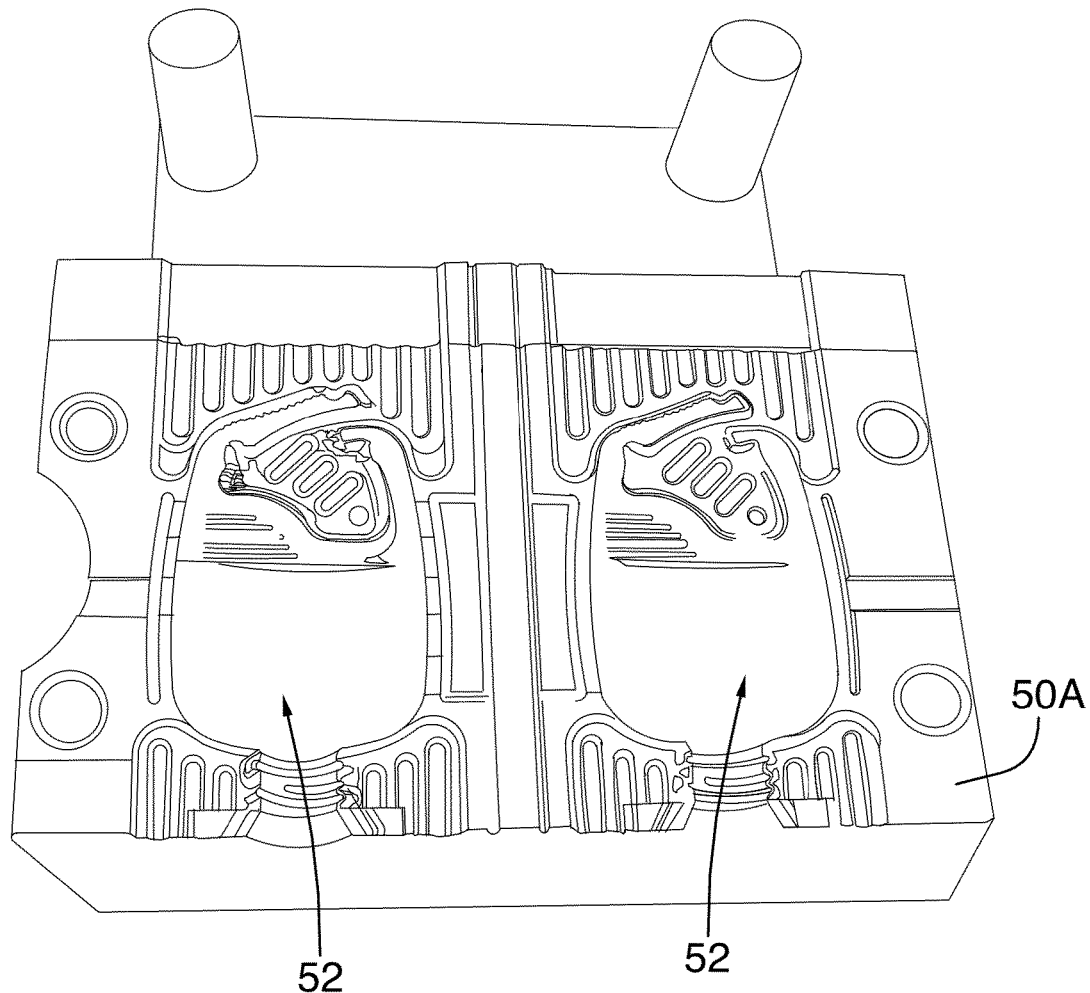
FIG. 5 is a front elevational view of a rear mold for forming a bottle according to the invention.
Figure 6:
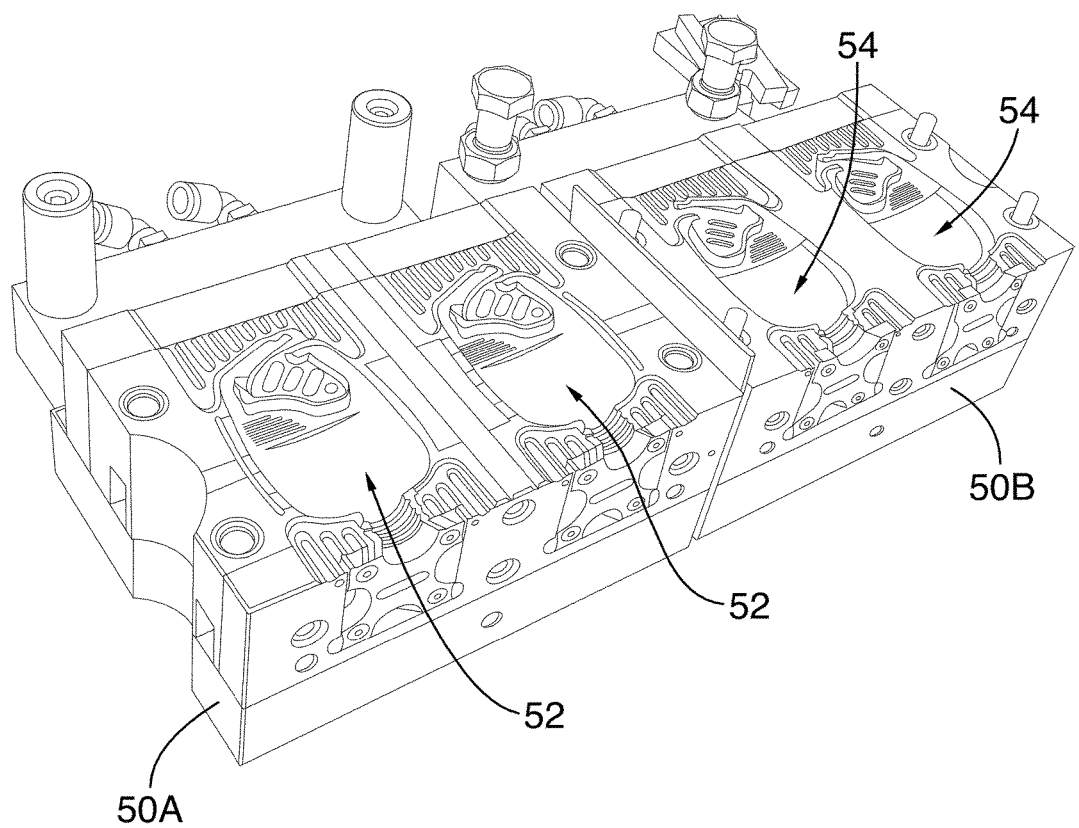
FIG. 6 is a bottom front right perspective view of the rear mold of FIG. 5 and a bottom rear left perspective view of a front mold for forming a bottle according to the invention.
Figure 7:
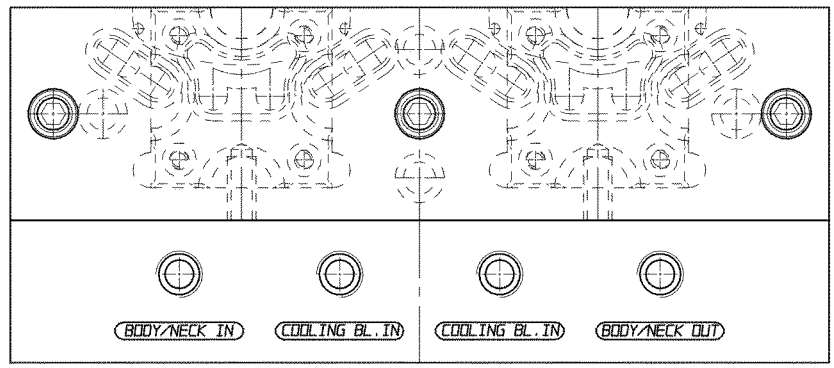
FIG. 7 includes top and front elevational views of the rear mold of FIG. 5, showing blow molding chambers thereof in phantom outline.
Figure 7:
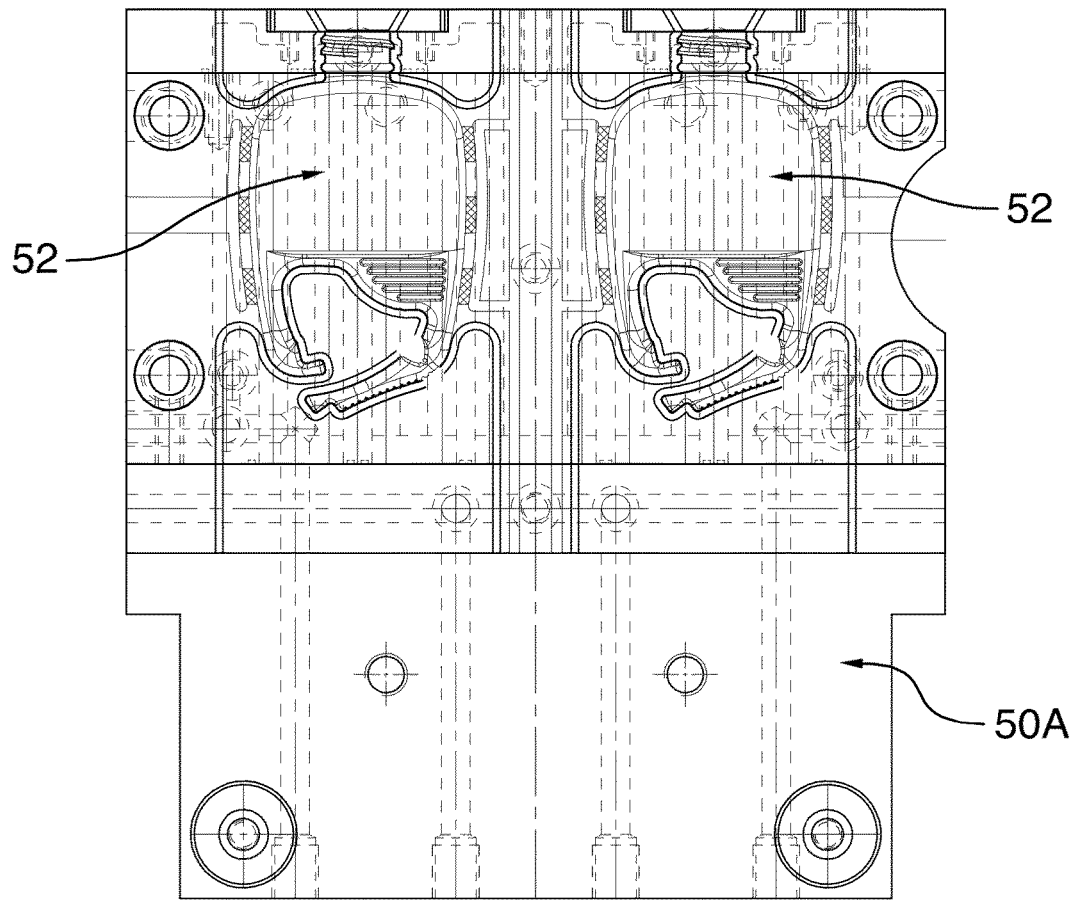
Figure 8A:
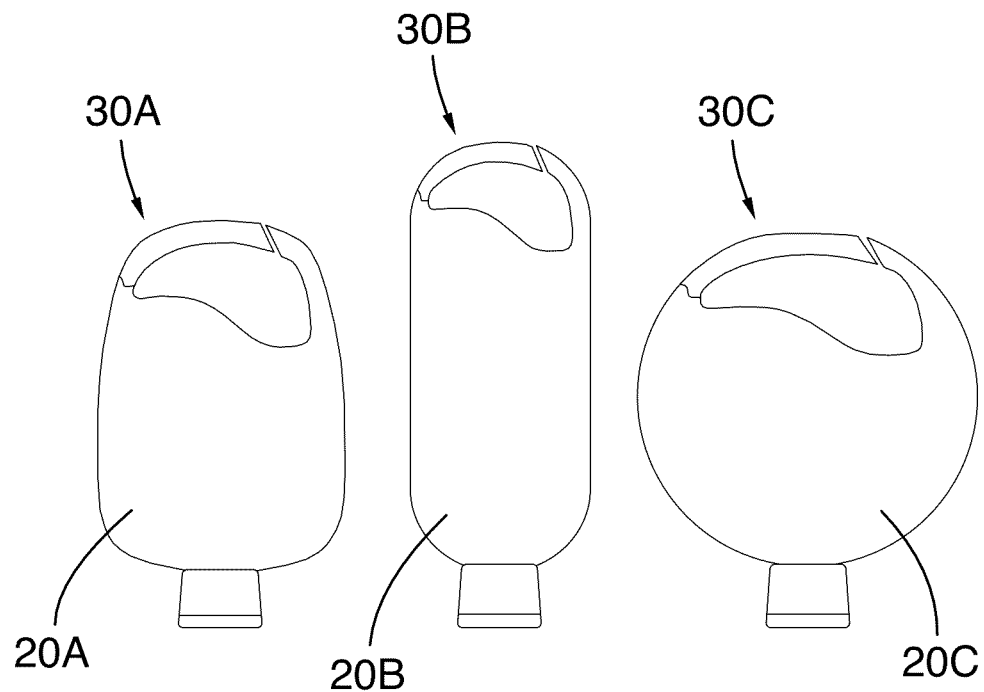
FIG. 8A is a front elevational view of three different bottles formed according to the invention, each shown with an arm thereof in the closed configuration.
Figure 8B:
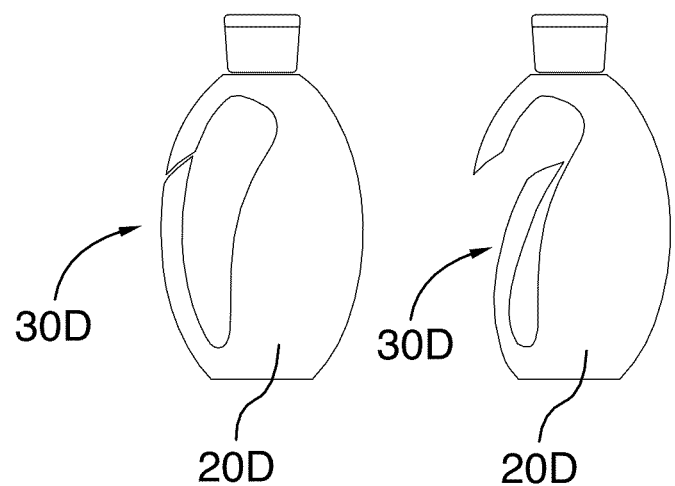
FIG. 8B includes two front elevational views of a further bottle formed according to the invention, alternately showing an arm thereof in the closed configuration and in a depressed open configuration.

FIGS. 5 to 7 below show an example mold 50A, 50B which employs a preferable method of "open molding" the clip 30 according to the invention. FIG. 5 shows a rear mold 50A. The rear mold 50A defines rear mold chambers 52, 52.

The rear mold 50A and the rear mold chambers 52, 52 shown in FIG. 5 are preferably used in forming two bottles 20, 20, each with an arm 34 molded in the open configuration according to the invention. FIG. 6 shows both the rear mold 50A and a front mold 50B for forming a bottle 20 according to the invention. The front mold 50B defines front mold chambers 54, 54. Together, the rear mold 50A and front mold 50B and their mold chambers 52, 52, 54, 54 are preferably used to form bottles 20 provided, each provided with a clip 30, according to the invention. FIG. 7 shows, in phantom outline, blow molding chambers of the rear mold 50A, which are used to so form the bottles 20.

The part 30, once molded in the open elevated position, is preferably manually closed. It is preferably closed after molding by automated processes or manually by hand. The part 30 is preferably closed either immediately after molding or, preferably for enhanced spring-back performance, the part 30 (especially when plastic and blow molded) is preferably allowed to cool or set in the open position, and then closed at a later date. This may preferably provide increased spring-back strength and stiffness.

According to the invention, in this method of manufacturing (herein called "open clip blow-molding"), the spring clip 30 dynamics are preferably impacted by the material properties. For instance, a strong clipping and spring action is preferably achieved by means of a combination of high-density and low-density polyethylene. Other materials may be suitable as well. For instance, alternate embodiments of this method are preferably suitable for polypropylene, polycarbonate, PVC, and the like. Additionally, the blow-molding manufacturing method according to the invention preferably allows for different wall thicknesses, preferably during each molding cycle. Varying the wall thickness at the spring points (e.g., at the hinge 32) preferably further enhances control over spring-dynamics and clip-dynamics.

The geometry and method according to the invention are preferably not limited to the shapes shown in the illustrations above. For instance, other shapes may be used such as (but not limited to) those shown in FIGS. 8A and 8B.

As well, this geometry and method are preferably not limited in size. A wide range of sizes may preferably be employed while achieving the clip geometry discussed here, including very small (e.g., single-servicing, sampling sized, <10 ml) and up to and beyond large sizes (e.g., >1 liter and above).

Manufacturing Method

There are preferably several suitable manufacturing methods for creating blow-molded clips 30 using the method(s) described herein. These preferably include methods such as extrusion blow molding, injection blow molding, and other methods of blow molding (among others). All of these are preferably molded using the open-clip molding technique according to the invention which is described herein.

Springback Enhancement

When a spring clip 30 (such as has been described here) is mechanically depressed (i.e., opened), it preferably returns to its original (i.e., closed) position. The speed at which it returns may be immediate and/or it may take some time—from moments to even several hours to return to a fully closed position. The speed at which it returns may be governed by the amount of initial deformation (i.e., how far the spring was flexed), as well as and/or in addition to the material properties (i.e., what type of plastic may be used). This property we may refer to herein as "springback."

According to the invention, by controlling the plastic, the springback is preferably enhanced. Certain springback properties are preferably achieved by controlling the blend ratios of LDPE and HDPE (e.g., low vs. high-density polyethylene), whereby the LDPE preferably provides flexibility while the HDPE preferably provides rigidity in mechanical structure, preferably to cause a higher spring force and optimized springback.

According to the invention, by including certain plastic additives, springback is preferably controlled and improved. For instance, according to the invention, springback is preferably improved to a point of immediate springback (i.e., having the clip 30 return to its original position after a full depression, substantially immediately), preferably by including in the raw plastic material additives such as (but not limited to) flexibilizers, plasticizers, impact modifiers, and/or structural modifiers such as fibers (e.g., glass, carbon, and the like) and/or mineral fillers (e.g., talc and the like). According to the invention, additives are preferably used to enhance the mechanical flex and springback properties of a blow-molded clip 30.

Supplementary Description

A method according to the invention produces an article 20—preferably a hollow container 20 defining an interior chamber 22—having a clip 30 for securing the article 20 to another item (not shown). In the method according to the invention, the article 20 is formed of a composition of matter and blow molded to have a unitary construction and to integrally provide the clip 30 as a part of the article 20.

This blow molding is such that the clip 30 has a hinge 32 where the clip bends, and a carabiner-type arm 34 which is initially blow molded into an open elevated configuration. The article 20 is preferably extrusion and/or injection blow molded, with the carabiner-type arm 34 initially extrusion and/or injection blow molded into the open elevated configuration.

The carabiner-type arm 34 is resiliently pivotable from the open elevated configuration, preferably about the hinge 32, into a closed configuration and into a depressed open configuration. In the closed configuration, the carabiner-type arm 34 is in selectively releasable and secure engagement with a catch portion 40 provided on the article 20. The carabiner-type arm 34 is biased towards the catch portion 40. In the closed configuration, the carabiner-type arm 34 is preferably biased with sufficient pre-built tension to stay in the aforesaid selectively releasable and secure engagement with the catch portion 40.

The aforesaid pre-built tension is sufficient to bias the carabiner-type arm 34 to return to the closed configuration after it is mechanically moved to the depressed open configuration.

In the depressed open configuration, the carabiner-type arm 34 is depressed relative to and biased towards the closed configuration. The depressed open configuration is traversed to secure the article 20 to the aforesaid item.

The blow molding step is also such that, in the open elevated configuration, the carabiner-type arm 34 is elevated relative to the closed configuration.

After the carabiner-type arm 34 is initially blow molded into the open elevated configuration, the carabiner-type arm 34 is selectively pivotable—by hand—from the open elevated configuration into the closed configuration, and from the closed configuration into the depressed open configuration.

Preferably, the carabiner-type arm 34 is in the closed configuration. The carabiner-type arm 34 is preferably initially moved from the open elevated configuration into the closed configuration, preferably by automated processes. The clip 30 is preferably allowed to cool or set in the elevated open position, before the carabiner-type arm 34 is moved to the closed configuration.

The composition of matter includes one or more polyethylene materials and one or more plastic additives to provide the arm with the aforesaid sufficient pre-built tension. (The composition of matter may also or instead include a polypropylene material, a polycarbonate material, and/or a PVC material.) The polyethylene materials preferably include a combination of one or more HDPE materials and/or one or more LDPE materials. The combination is preferably a controlled blend of (a) the HDPE materials to provide the arm 34 and the clip 30 with rigidity in mechanical structure, and (b) the LDPE materials to provide the arm 34 and the clip 30 with flexibility. Together, this blend preferably provides the arm 34 with the aforesaid sufficient pre-built tension.

The additives preferably include a flexibilizer material, a plasticizer material, an impact modifier material and/or a structural modifier material. The structural modifier material is preferably a fiber material (e.g., a glass fiber material, a carbon fiber material) and/or a mineral filler material (e.g., a talc material).

CONCLUSION

The invention is contemplated for use in association with blow molding and containers, to afford increased functionality and/or advantageous utilities in association with same. The invention, however, is not so limited.

The foregoing description has been presented for the purpose of illustration and is not intended to be exhaustive or to limit the invention to the precise form disclosed.

Naturally, in view of the teachings and disclosures herein, persons having ordinary skill in the art may appreciate that alternate designs and/or embodiments of the invention may be possible (e.g., with substitution of one or more components for others, with alternate configurations of components, etc). Although some of the components, relations, configurations and/or steps according to the invention are not specifically referenced in association with one another, they may be used, and/or adapted for use, in association therewith. All of the aforementioned, depicted and various structures, configurations, relationships, utilities and the like may be, but are not necessarily, incorporated into and/or achieved by the invention. Any one or more of the aforementioned structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention.

Other modifications and alterations may be used in the design, manufacture, and/or implementation of other embodiments according to the present invention without departing from the spirit and scope of the invention, which is limited only by the claims hereof.

What is claimed is:

1. A method to produce a blow molded article of unitary construction having a clip for securing the article to another item, wherein the method comprises a step of blow molding the article to have said unitary construction and to integrally provide the clip as a part unitary with the article, such that the clip defines a ring adapted for quick and reversible connections by, on one side of the ring, a hinged swingable gate arm which is initially blow molded into a molded open elevated configuration and resiliently deformable and pivotable therefrom into (i) a closed configuration wherein the swingable gate arm is biased, with a pre-built springback tension structurally molded into the blow molded article, into selectively releasable and secure engagement with a catch portion provided on the article and (ii) a depressed open configuration wherein the swingable gate arm is depressed relative to and biased with said pre-built springback tension towards the closed configuration, with the swingable gate arm being self-closing and the depressed open configuration being traversed to secure the article to said item; and such that in the molded open elevated configuration, the swingable gate arm is elevated relative to the closed configuration.

2. A method according to claim 1, wherein the article is blow molded such that the clip has a hinge where the clip bends, and wherein the swingable gate arm is resiliently pivotable from the molded open elevated configuration, about the hinge, into the closed configuration and the depressed open configuration.

3. A method according to claim 2, wherein in the closed configuration, the swingable gate arm is biased with said pre-built springback tension to stay in selectively releasable and secure engagement with the catch portion.

4. A method according to claim 3, wherein after the swingable gate arm is initially blow molded into the molded open elevated configuration, the swingable gate arm is selectively pivotable, by hand, from the molded open elevated configuration into the closed configuration, and from the closed configuration into the depressed open configuration.

5. A method according to claim 3, wherein after the swingable gate arm is initially blow molded into the molded open elevated configuration, the swingable gate arm is initially moved from the molded open elevated configuration into the closed configuration by one or more automated processes.

6. A method according to claim 5, wherein after the swingable gate arm is blow molded into the molded open elevated configuration, the clip is allowed to cool and set in the elevated open position, before the swingable gate arm is moved to the closed configuration.

7. A method according to claim 6, wherein the article is extrusion blow molded, and the swingable gate arm is initially extrusion blow molded into the molded open elevated configuration.

8. A method according to claim 6, wherein the article is blow molded by a blow molding process selected from the group consisting of extrusion blow molding and injection blow molding, and the swingable gate arm is initially blow molded into the molded open elevated configuration by said blow molding process.

9. A method according to claim 6, wherein the swingable gate arm is biased with said pre-built springback tension to return to the closed configuration after the swingable gate arm is mechanically moved to the depressed open configuration.

10. A method according to claim 9, wherein the article is blow molded as a hollow container.

* * * * *